US012176129B2

(12) United States Patent
Dettling et al.

(10) Patent No.: US 12,176,129 B2
(45) Date of Patent: Dec. 24, 2024

(54) POWER TOOL WITH A WIRE HARNESS EXTENDING BETWEEN A DRIVE UNIT AND AN OPERATING HANDLE

(71) Applicant: Andreas Stihl AG & Co. KG, Waiblingen (DE)

(72) Inventors: Andreas Dettling, Stuttgart (DE); Dennis Karl, Freiberg a. N. (DE); Denis Ehrler, Wernau (DE); Markus König, Leinfelden-Echterdingen (DE); Manuel Waiblinger, Stuttgart (DE); Jan Lukas Braun, Waiblingen (DE); Alexander Härtel, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 629 days.

(21) Appl. No.: 17/541,720

(22) Filed: Dec. 3, 2021

(65) Prior Publication Data

US 2022/0189657 A1    Jun. 16, 2022

(30) Foreign Application Priority Data

Dec. 11, 2020   (EP) ..................................... 20213470

(51) Int. Cl.
*H01B 7/22*        (2006.01)
*A01G 20/47*    (2018.01)
(Continued)

(52) U.S. Cl.
CPC ............ *H01B 7/223* (2013.01); *A47L 9/2889* (2013.01); *B25F 5/00* (2013.01); *A01G 20/47* (2018.02)

(58) Field of Classification Search
CPC .... A01D 20/47; A01D 34/4167; A01G 3/062; H01B 7/18; H01B 7/22; H01B 7/24; B25F 5/00; A47L 9/2889
(Continued)

(56) References Cited

U.S. PATENT DOCUMENTS 4,254,549 A * 3/1981 McMullin .............. H02G 1/005
                                                                30/251
6,799,642 B2 * 10/2004 Wolf ....................... F16F 1/128
                                                                173/162.1
(Continued)

FOREIGN PATENT DOCUMENTS

DE     10 2005 007 675          8/2006

*Primary Examiner* — Thomas B Will
*Assistant Examiner* — Julia C Tran
(74) *Attorney, Agent, or Firm* — Gudrun E. Huckett

(57) ABSTRACT

A power tool has a drive unit and an operating handle. At least one electrical line connects the operating handle and the drive unit to each other. The at least one electrical line is fastened at a first electrical connection location to the operating handle and at a second electrical connection location to the drive unit. A safety cable extends along the at least one electrical line between operating handle and drive unit. The safety cable has a first end section and a second end section. The first end section is connected mechanically fixed at a first fixation location to the operating handle. The second end section is connected mechanically fixed at a second fixation location to the drive unit. The at least one electrical line and the safety cable are guided together such that the safety cable forms a tear-off protection for the at least one electrical line.

17 Claims, 4 Drawing Sheets

(51) Int. Cl.
*A47L 9/28* (2006.01)
*B25F 5/00* (2006.01)

(58) Field of Classification Search
USPC .................................................. 173/162.2
See application file for complete search history.

(56) References Cited

U.S. PATENT DOCUMENTS

| | | | |
|---|---|---|---|
| 9,561,599 B2* | 2/2017 | Kurzenberger | B25F 5/008 |
| 9,623,547 B2* | 4/2017 | Kurzenberger | B25F 5/006 |
| 2006/0185114 A1* | 8/2006 | Joos | A01G 20/47 |
| | | | 15/330 |
| 2007/0136976 A1 | 6/2007 | Raffenberg | |
| 2008/0148915 A1 | 6/2008 | Nickels et al. | |
| 2008/0276469 A1* | 11/2008 | Guip | B27B 17/0033 |
| | | | 173/162.2 |
| 2009/0095497 A1* | 4/2009 | Zimmermann | B64F 1/368 |
| | | | 173/217 |
| 2011/0226501 A1 | 9/2011 | Wolf et al. | |
| 2016/0021819 A1* | 1/2016 | Nakano | B25F 5/02 |
| | | | 30/276 |

* cited by examiner

POWER TOOL WITH A WIRE HARNESS EXTENDING BETWEEN A DRIVE UNIT AND AN OPERATING HANDLE

BACKGROUND OF THE INVENTION

The invention relates to a power tool with a drive unit and an operating handle. Such a power tool can be, for example, a blower, a trimmer or a similar power tool which comprises an electric motor or an internal combustion engine as a drive unit. The operating handle is connected in particular by a plurality of electrical lines to the drive unit, wherein an electrical line is secured at a first electrical connection location in the operating handle and at a second electrical connection location at the drive unit.

It can be expedient to combine some of the electrical lines to a line bundle or a wire harness and guide them together from the operating handle to the drive unit.

For example, when in a blower device the operating handle for guiding the blower air flow is attached to the blower tube, a line bundle or wire harness can be attached to the exterior of the blower tube and guided from the operating handle to the drive unit. The arrangement entails the danger that, in the environment where the work is to be performed, foreign matter such as branches or the like get hooked at the line bundle and impair operation of the blower tube. In this context, it is to be taking into consideration that a high transverse force and/or pulling force is acting on individual electrical lines, and this can cause the electrical line to be torn off the connection locations but can also cause the electrical line itself to break. This problem occurs in particular when the electrical lines are signal lines and therefore are embodied to be mechanically resilient only to a limited extent.

The object of the invention is therefore to further develop a power tool with a drive unit and an operating handle such that electrical lines, in particular, electrical signal lines, that extend between the operating handle and the drive unit are protected from damage, for example, from severing contact by mechanical forces.

SUMMARY OF THE INVENTION

In accordance with the present invention, this is achieved for a power tool of the aforementioned kind in that, in addition to the electrical line that is connected to the electrical contact locations, a safety cable is provided that is extending between the operating handle and the drive unit, wherein one end section of the safety cable is mechanically fixed at the operating handle and the other end section of the safety cable is mechanically secured at the drive unit, wherein the electrical line is guided together with the safety cable in such a way that the safety cable forms a tear-off protection for the electrical line.

At least adjacent to an electrical line connected to the electrical contact locations, a safety cable is provided that extends between the operating handle and the drive unit. The safety cable extends preferably along the electrical line, in particular parallel to the electrical line. An end section of the safety cable is mechanically fixed at, in particular in, the operating handle. The other end section of the safety cable is mechanically secured at or in the drive unit. The arrangement is preferably selected such that the electrical line is guided together with the safety cable. The safety cable provides a tear-off protection for the electrical line.

The safety cable can be preferably guided mechanically parallel to the electrical line and can be fixed mechanically in the region of the connection locations of the electrical line with one end at the operating handle and with the other end at the drive unit. Since the electrical line is guided together with the safety cable, a foreign body that is getting hooked can engage the safety cable together with electrical line and can exert a transverse force on the combination of electrical line and safety cable. The length of the safety cable in this context is dimensioned such that, before the electrical line can be torn off from the connection locations, the safety cable is tensioned and the introduced transverse force is mechanically transmitted, on the one hand, to the operating handle and, on the other hand, to the drive unit. Tearing off of the electrical line at its connecting locations is safely prevented.

In a particular embodiment of the invention, the safety cable is electrically conductively configured. The safety cable forms thus, on the one hand, a mechanical tear-off protection and, on the other hand, an electrical line.

In a further embodiment of the invention, it is provided that the safety cable is electrically conductively contacted at the operating handle and is electrically conductively connected to the drive unit. When the operating handle is provided with an outer electrically conductive wall surface and this electrically conductive wall surface is contacted electrically conductively with the safety cable, a potential compensation between the operating handle and the drive unit is produced by means of the safety cable.

In order to decouple the electrical function of the safety cable from its mechanical function as a tear-off protection, it is provided that the other end section of the safety cable at the drive unit is mechanically secured in the region in front of its end and that the end of the safety cable, in its function as an electrical line, is connected to an electrical connection point. In this manner, it is ensured that forces that are acting on the safety cable in the region in front of the (electrical) end of the safety cable are dissipated and the connection at the electrical connection point remains mechanically free of forces. An expedient mechanical connection of the safety cable is advantageously produced by shaped nipples.

In a particular embodiment of the invention, the electrical lines are combined to a line bundle or a wire harness. The wire harness is extended together with the safety cable between the operating handle and the drive unit. Advantageously, the line bundle or the wire harness and the safety cable are guided inside a cable sleeve. Other embodiments may be advantageous.

Expediently, the safety cable is guided so as to be decoupled from the electrical lines of the line bundle or the wire harness. This means that the safety cable is provided in particular outside of the line bundle or of the wire harness. This ensures that the safety cable cannot cause any mechanical damage at the electrical lines of the line bundle or of the wire harness.

For protecting the electrical lines that are extending adjacent to the safety cable, the safety cable expediently can be provided with a sheath. This sheath can be made of a material with low friction coefficient so that no wear of the insulation of the electrical lines occurs in case of relative movements between the safety cable and the electrical lines. Expediently, the sheath of the safety cable is comprised of a flexible material with good gliding properties, preferably of plastic material, in particular of polyacetal (POM). For a good mechanical connection of the safety cable to the drive unit, it is advantageously provided that, inside the drive unit, the safety cable projects from the sheath and carries a shaped nipple in this region for mechanically connecting the safety cable to the drive unit.

The electrically conductive safety cable is embodied preferably as a steel cable, wherein a multi-core steel cable is expedient for good flexibility.

Advantageously, the invention is in particular provided for use in a blower device as a power tool, wherein the blower device comprises a blower tube for guiding the blower air flow. The operating handle is secured to the blower tube so that the user can hold and guide the blower tube by means of the operating handle. In the operating handle, actuating elements for operating the drive unit are provided.

When the drive unit is an electric motor, a plurality of electrical lines, in particular signal lines, are provided between the operating handle and the drive unit for control of the drive unit. The electrical lines which are combined in particular to a line bundle or wire harness are preferably extending outside of the blower tube. By providing the safety cable, it is ensured that, even upon engagement of a foreign body at the combination of safety cable and electrical lines, the occurring forces do not cause tearing off of the electrical lines from their connecting locations.

In a particular embodiment of the invention, it is provided that the length of the electrical lines is longer or identical to the length of the safety cable between its mechanical connection to the operating handle at the first fixation location and its mechanical connection to the drive unit at the second fixation. In this way, it is ensured that the safety cable is loaded by forces prior to a corresponding force load being able to act on the electrical lines.

An embodiment of the invention will be explained in the following in detail with regard to its features with the aid of the drawings. The features which are disclosed in the claims, the description, and the drawings can be combined with each other at will without leaving the gist of the disclosed invention.

DESCRIPTION OF THE PREFERRED EMBODIMENTS

Figure 1:
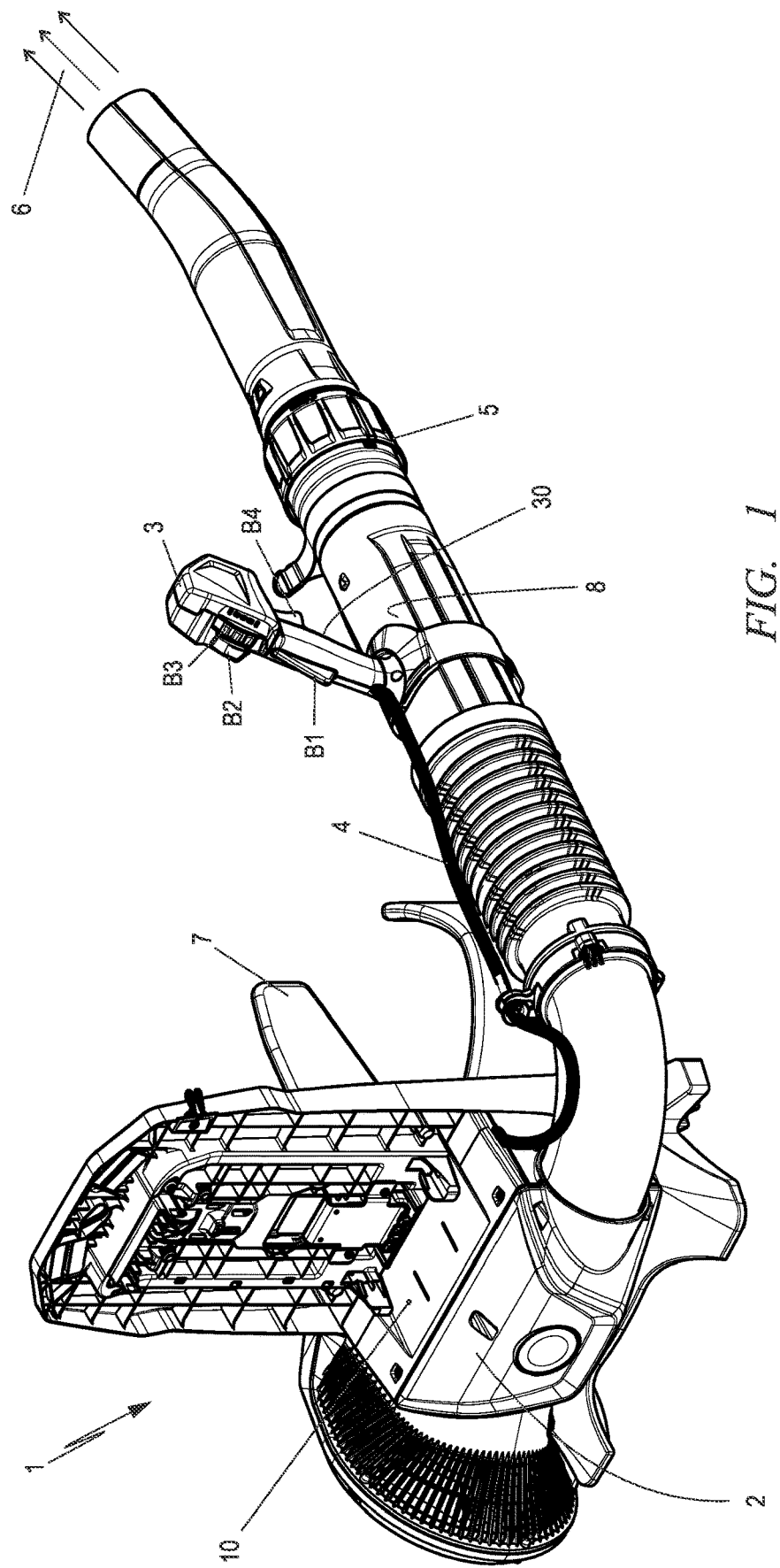
FIG. 1 is a partial illustration of a power tool based on the example of a blower embodied in particular as backpack blower with an electric motor as a drive unit.

FIG. 1 illustrates, based on the example of a blower 10, a power tool 1 which comprises a drive unit 2 as well as an operating handle 3 for a user. The power tool 1 can be embodied also as a trimmer, a pole pruner, or a similar power tool 1 with an operating handle 3.

In the illustrated blower 10, the operating handle 3 is secured on a blower tube 5. The blower tube 5 is guided by the user by means of the operating handle 3 for controlling the blower air flow 6. The power tool 1 is carried on the back of the user and is secured by a hip belt 7 on the hip of the user. For controlling the drive unit 2, in particular electric drive unit, the operating handle 3 comprises a plurality of operating elements B1 to B4. The operating elements B1 to B4 can actuate electrical switches (S1), electrical adjusting elements or the like in the operating handle 3.

Figure 6:
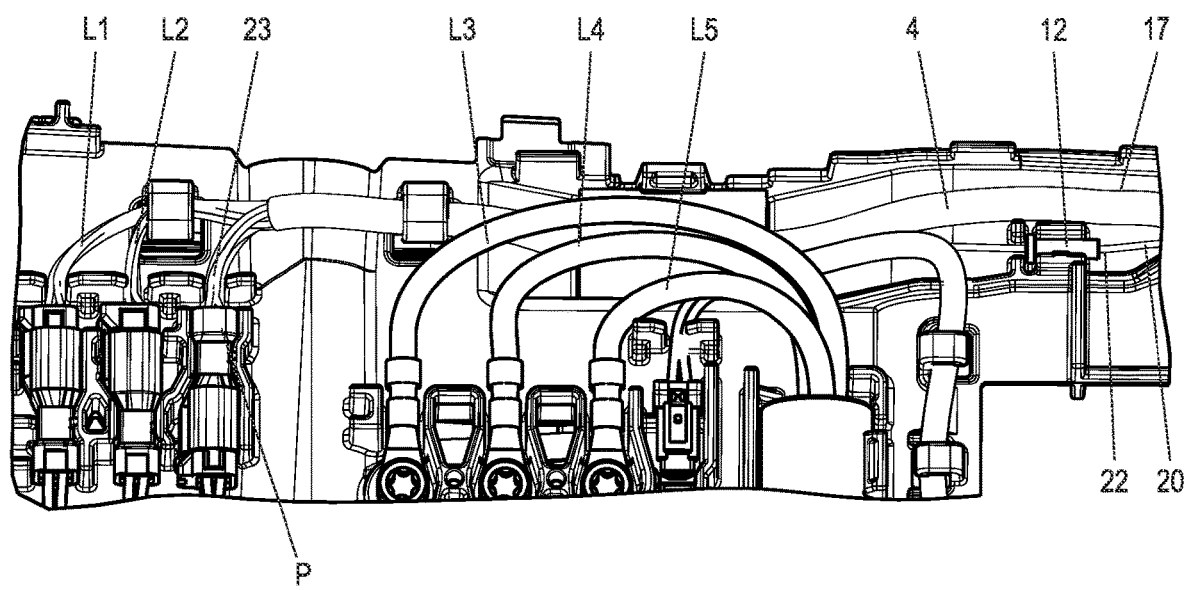
FIG. 6 is a schematic illustration of the connection locations of the electrical lines of a wire harness in the housing of the drive unit in combination with the mechanical and electrical connection of the end section of the safety cable to the drive unit.

For transmitting electrical control signals, in particular electrical control variables and/or operating variables, the operating handle 3 is connected preferably by a plurality of electrical lines L1 to L5 (FIG. 6) to the drive unit 10. In the schematic embodiment according to FIG. 1, a plurality of electrical lines are combined and guided together, in particular are combined to a line bundle or wire harness 4. The electrical lines are in particular signal lines. Signal lines, in comparison to power transmitting electrical lines, are mechanically only minimal resilient; when acted on by transverse forces or pulling forces, they can be mechanically damaged. A mechanical damage at a signal line can be in the form of the signal line being torn off the connection location but can also be an inner breakage of the electrical line.

In the illustrated embodiment as shown in FIG. 1, the electrical lines, in particular the wire harness 4, are guided on the outer circumference 8 of the blower tube 5 from the operating handle 3 to the drive unit 2. It can be expedient to guide one or a plurality of electrical lines as a line bundle L, in particular as a wire harness 4, inside the blower tube 5.

Figure 2:
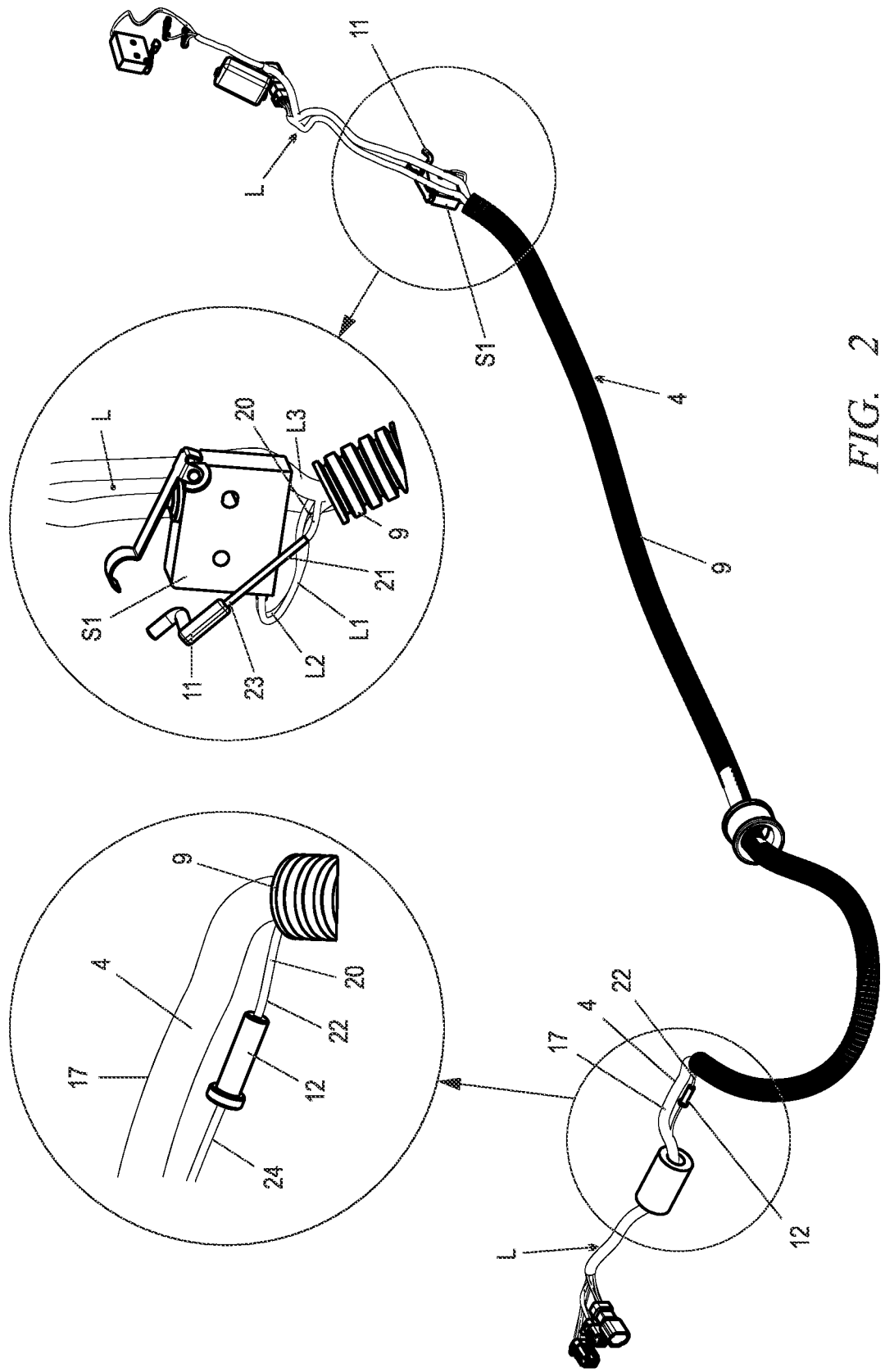
FIG. 2 is a schematic illustration for guiding bundled electrical lines between an operating handle of the power tool and the drive unit of the power tool.

In FIG. 2, a schematic illustration of the electrical lines L as a wire harness 4 extending in a cable sleeve 9 is shown. As can be seen in the illustration, a safety cable 20 extends along at least one electrical line L1, L2, L3. In the embodiment according to FIG. 2, the safety cable 20 is guided along a line L1, L2, or L3, in particular parallel thereto, in particular within a line bundle L or a wire harness 4. The safety cable 20 extends, together with the line bundle L or the wire harness 4, in the cable sleeve 9. It can be advantageous to guide the safety cable 20 separately from the line bundle L or the wire harness 4 in the cable sleeve 9.

Figure 4:
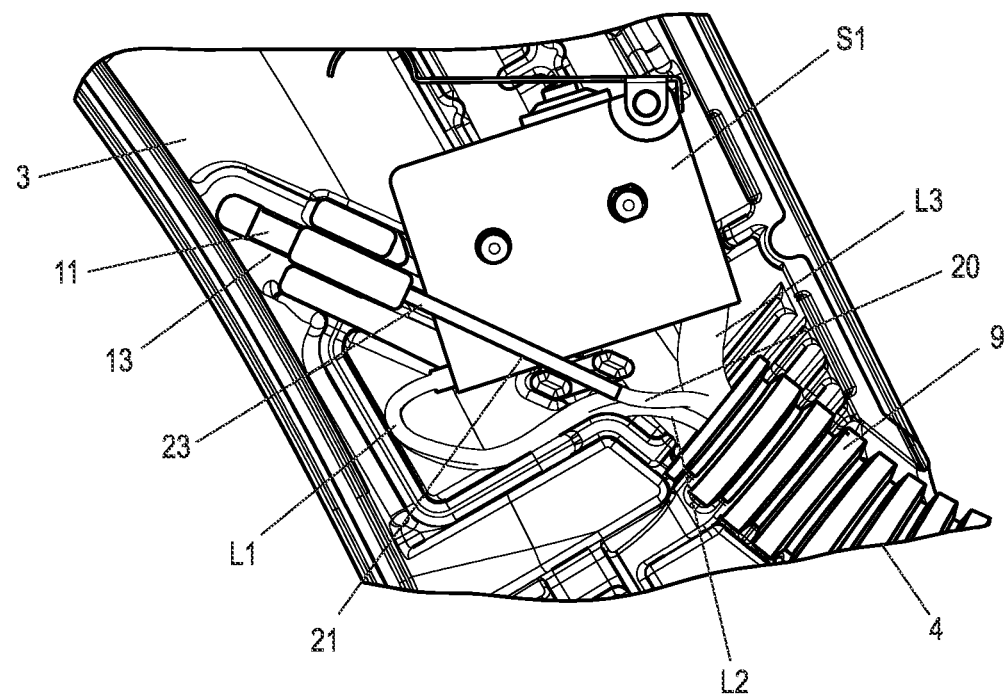
FIG. 4 is an enlarged detail illustration of the mechanical connection of the safety cable to the operating handle.

The safety element 20 is secured with an end section 21 (FIG. 4) to the operating handle 3, in particular in the interior of the operating handle 3. For this purpose, the end 23 of the safety cable 20 comprises a shaped nipple 11 that engages a corresponding nipple receptacle 13 of the operating handle 3. The shaped nipple 11 is held by form fit inside the operating handle 3. The safety cable 20 is mechanically fixed at its first end section 21 (first fixation location).

Figure 3:
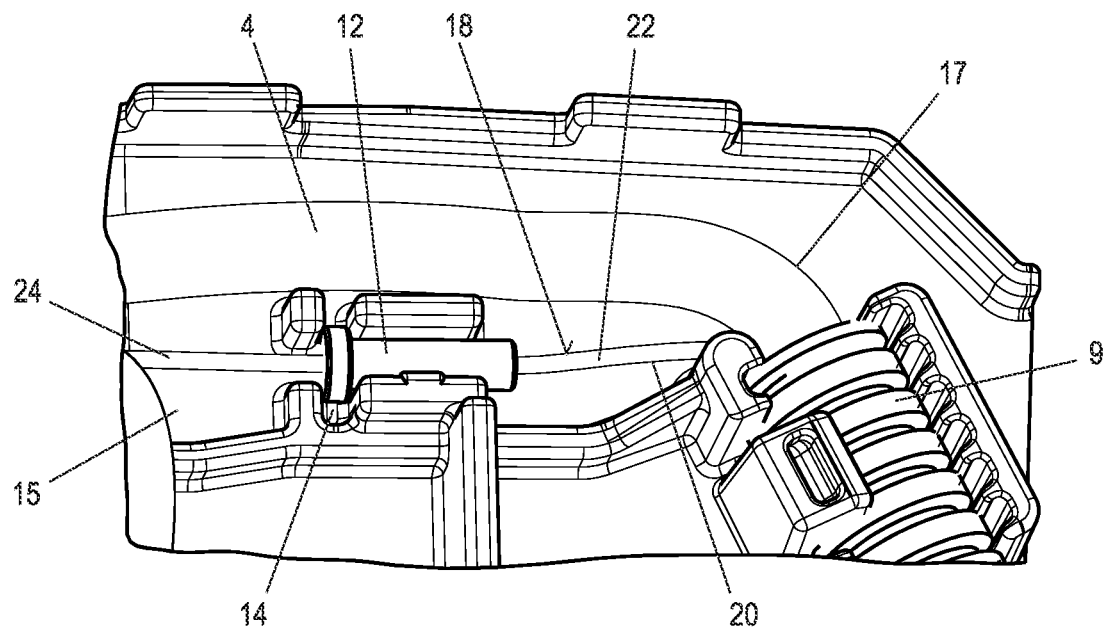
FIG. 3 is an enlarged detail illustration of the mechanical connection of the safety cable to the drive unit.

At the other end section 22 of the safety cable 20 (FIG. 3; FIG. 2 to the left), a shaped nipple 12 is secured which engages a nipple receptacle 14 of the housing 15 of the drive unit 2. By means of the shaped nipple 12, the other end section 22 of the safety cable 20 is mechanically secured at the drive unit 2 (second fixation location), preferably at the housing 15 of the drive unit 2.

The safety cable 20 extends in particular along the lines L1, L2, L3, preferably parallel to the lines L1, L2, L3. The electrical lines L1, L2, L3 are guided together with the safety cable 20 from the operating handle 3 to the drive unit 2. Since the safety cable 20 is mechanically secured in the region of its end sections 21 and 22, on the one hand, at the operating handle 3 and, on the other hand, at the drive unit 2, the safety cable 20 provides a tear-off protection for the electrical lines L1, L2, L3 extending along the safety cable 20.

The safety cable 20 is in particular embodied as an electrically conductive safety cable 20. Preferably, the safety cable 20 is comprised of a steel cable, in particular of a flexible multi-core steel cable.

The electrically conductive safety cable 20 is thus, on the one hand, a mechanical tear-off protection and forms, on the other hand, an electrical line. The electrically conductive safety cable 20 has a dual function.

Figure 5:
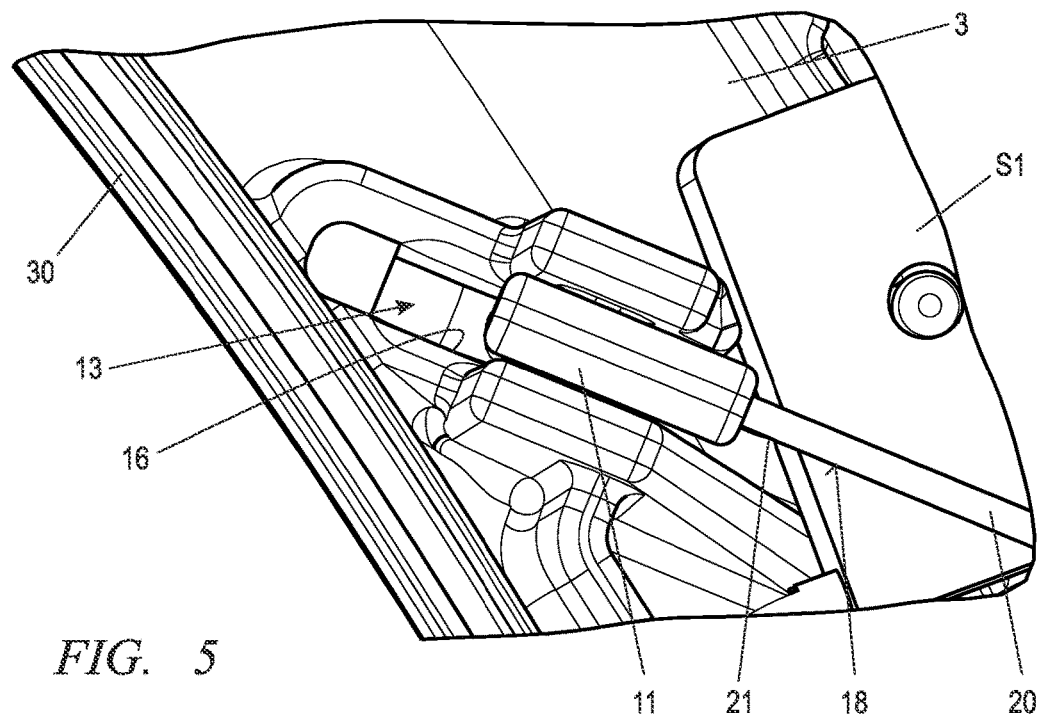
FIG. 5 is an enlarged illustration of the coupled electrical and mechanical connection of the safety cable to the operating handle.

The operating handle 3 (FIG. 1) comprises preferably an outer electrically conductive wall surface 30, e.g. made of an electrically conductive plastic material. This electrically conductive wall surface 30, as illustrated in FIG. 5, is connected to the shaped nipple 11 of the safety cable 20 so as to provide electrical contact. For this purpose, the nipple receptacle 13 comprises an inner lining 16 which is comprised of an electrically conductive material. The inner lining 16 is connected electrically to the outer wall surface 30 of electrically conductive material of the operating handle 3. Preferably, the lining 16 of the nipple receptacle 13 is embodied as one piece together with the electrically conductive material of the wall surface 30. By engagement of the shaped nipple 11 in the nipple receptacle 13 provided with the lining 16, an electrical contact between the electrically conductive safety cable 20 and the outer wall surface 30 of the operating handle 3 is produced.

The safety cable 20 projects at its other end section 22 from an outer envelope 17 of the line bundle L and is provided with the shaped nipple 12. The shaped nipple 12 engages the nipple receptacle 14, which is in particular fast with the housing, and provides the mechanical connection of the safety cable 20 to the drive unit 2. The end 24 of the safety cable 20 which projects past the shaped nipple 12 extends to an electrical connection point P and is electrically connected thereto. The mechanical connection of the safety cable 20 in the drive unit 2 is realized by the shaped nipple 12. The extension of the safety cable 20 past the shaped nipple 12 forms the electrical line of the safety cable 20 to the electrical connection point P. The safety cable 20 is connected in the region of one end section 21 electrically conductively to the wall surface 30 of the operating handle 3 and in the region of its other end section 12 electrically conductively to the connection point P. The safety cable 20 can thus produce a potential compensation between the operating handle 3 and the drive unit 2. Expediently, the connection point P is ground.

As illustrated in the embodiment, the safety cable 20 can be guided inside of the line bundle L within a common envelope 17. In order to prevent mechanical damage of the electrical lines of the line bundle L, it is provided that the safety cable 20 has a sheath 18 of a flexible material which has good gliding properties. A suitable material is plastic material, in particular a sheath of polyacetal (POM).

The specification incorporates by reference the entire disclosure of European priority document 20 213 470.6 having a filing date of Dec. 11, 2020.

While specific embodiments of the invention have been shown and described in detail to illustrate the inventive principles, it will be understood that the invention may be embodied otherwise without departing from such principles.

What is claimed is:

1. A power tool comprising:
    a drive unit;
    an operating handle;
    at least one electrical line connecting the operating handle and the drive unit to each other, wherein the at least one electrical line is fastened at a first electrical connection location to the operating handle and fastened at a second electrical connection location to the drive unit;
    a safety cable extending along the at least one electrical line between the operating handle and the drive unit, wherein the safety cable has a first end section and a second end section, wherein the first end section is connected mechanically fixed at a first fixation location to the operating handle and the second end section is connected mechanically fixed at a second fixation location to the drive unit;
    wherein the at least electrical line and the safety cable are guided together such that the safety cable forms a tear-off protection for the at least one electrical line.

2. The power tool according to claim 1, wherein the safety cable is electrically conductive.

3. The power tool according to claim 2, wherein the safety cable contacts the operating handle electrically conductively and is connected electrically conductively to the drive unit.

4. The power tool according to claim 2, wherein the operating handle comprises an outer electrically conductive wall surface and the safety cable electrically conductively contacts the outer electrically conductive wall surface.

5. The power tool according to claim 1, wherein the safety cable provides a potential compensation between the operating handle and the drive unit.

6. The power tool according to claim 1, wherein the second fixation location of the second end section of the safety cable is located in front of an end of the safety cable and wherein the end of the safety cable projecting past the second fixation location provides an electrical connection.

7. The power tool according to claim 1, wherein the safety cable is mechanically fixed by shaped nipples.

8. The power tool according to claim 1, wherein a plurality of the at least one electrical line are combined to a line bundle, wherein the line bundle and the safety cable extend together from the operating handle to the drive unit.

9. The power tool according to claim 8, further comprising a cable sleeve, wherein the line bundle and the safety cable extend together in the cable sleeve.

10. The power tool according to claim 1, wherein a plurality of the at least one electrical line form a line bundle and wherein the safety cable is decoupled from the line bundle.

11. The power tool according to claim 1, wherein the safety cable is provided with a sheath.

12. The portal according to claim 1, wherein a shaped nipple is disposed on the safety cable and arranged inside a housing of the drive unit.

13. The power tool according to claim 1, wherein the safety cable is a steel cable.

14. The power tool according to claim 1, wherein the drive unit is an electric drive unit.

15. The power tool according to claim 1, wherein the power tool is a blower device comprising a blower tube, wherein the operating handle is secured on the blower tube, wherein a plurality of the at least one electrical line form a line bundle extending along the blower tube.

16. The power tool according to claim 15, wherein the line bundle extends outside of the blower tube along the blower tube.

17. The power tool according to claim 1, wherein a length of the at least one electrical line between the first connection location and the second connection location is longer than or identical to a length of the safety cable between the first fixation location and the second fixation location.

\* \* \* \* \*